US009672321B2

(12) United States Patent
Berry et al.

(10) Patent No.: US 9,672,321 B2
(45) Date of Patent: Jun. 6, 2017

(54) VIRTUAL POSITIVE SLACK IN PHYSICAL SYNTHESIS

(71) Applicant: International Business Machines Corporation, Armonk, NY (US)

(72) Inventors: Christopher J. Berry, Hudson, NY (US); Kaustav Guha, Bangalore (IN); Lakshmi N. Reddy, Briarcliff Manor, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 14/789,028

(22) Filed: Jul. 1, 2015

(65) Prior Publication Data

US 2017/0004245 A1    Jan. 5, 2017

(51) Int. Cl.
*G06F 17/50* (2006.01)
(52) U.S. Cl.
CPC .................. *G06F 17/5081* (2013.01)
(58) Field of Classification Search
CPC ............. G06F 17/5031; G06F 17/5068; G06F 17/5022; G06F 17/505; G06F 2217/82; G06F 8/443
USPC .......................................... 716/108, 113, 134
See application file for complete search history.

(56) References Cited

U.S. PATENT DOCUMENTS 6,209,119 B1    3/2001  Fukui
6,826,733 B2 *  11/2004 Hathaway ............. G06F 17/505
                                                       703/2
7,559,040 B1    7/2009  Albrecht et al.
8,296,710 B2   10/2012  Liu et al.
8,365,115 B2 *  1/2013  Liu ..................... G06F 17/5031
                                                       716/108
8,443,334 B1    5/2013  Guzy
8,806,410 B2    8/2014  Kumar et al.
9,330,216 B2 *  5/2016  Parnami ............. G06F 17/5045
(Continued)

FOREIGN PATENT DOCUMENTS

WO      2014064650 A2     5/2014

OTHER PUBLICATIONS

List of IBM Patents or Patent Applications Treated as Related; (Appendix P), filed Aug. 27, 2015; 2 pages.

(Continued)

*Primary Examiner* — Nghia Doan
(74) *Attorney, Agent, or Firm* — Cantor Colburn LLP

(57) ABSTRACT

A system and method of performing physical synthesis of a chip design are described. The method includes performing a baseline physical synthesis to determine a timing slack associated with each device, the timing slack indicating a margin by which timing requirements for the associated device are exceeded, determining that a threshold has been exceeded, the determining based on an analysis of a histogram of the timing slack, and executing a stage-by-stage physical synthesis based on determining that the threshold has been exceeded. The executing the stage-by-stage physical synthesis includes running a stage of the stage-by-stage physical synthesis to determine real timing slack, mapping the real timing slack to virtual timing slack, and running a next stage of the stage-by-stage physical synthesis using the virtual timing slack.

12 Claims, 4 Drawing Sheets

(56) References Cited

U.S. PATENT DOCUMENTS

2014/0237437 A1    8/2014  Mang et al.

OTHER PUBLICATIONS

Christopher J. Berry et al., "Virtual Positive Slack in Physical Synthesis", U.S. Appl. No. 14/837,149, filed Aug. 27, 2015.
Kim et al., "Behavior-to-Placed RTL Synthesis with Performance-Driven Placement", ACM, 2001, pp. 320-325.

* cited by examiner

VIRTUAL POSITIVE SLACK IN PHYSICAL SYNTHESIS

BACKGROUND

The present invention relates to physical synthesis of a chip design, and more specifically, to virtual positive slack in physical synthesis.

In the chip design process, logic and physical synthesis are performed, typically iteratively at different stages of the design, to facilitate implementation of a resistor-transfer level (RTL) design in a physical form on a chip. The logic and physical synthesis (referred to generally herein as physical synthesis because the two synthesis processes provide the physical implementation) is typically done by computer automated design (CAD) tools that enforce design objectives related to performance, power usage, and area usage. The performance objective typically emphasizes timing such that the physical synthesis algorithm is primarily concerned with timing critical portions of the design. This is because the synthesis process is ultimately limited by computational resources and the time it takes to converge on a synthesis result. Thus, continuing the synthesis process indefinitely to optimize every portion of the design is impractical. However, a consequence of this emphasis on timing is that, when sufficient timing margin is achieved by a part of the design, that part is typically not worked on any longer even if power usage or area usage are sub-optimal.

SUMMARY

According to an embodiment, a method of performing physical synthesis of a chip design including devices includes performing, using a processor, a baseline physical synthesis to determine a timing slack associated with each device, the timing slack indicating a margin by which timing requirements for the associated device are exceeded; determining that a threshold has been exceeded, the determining based on an analysis of a histogram of the timing slack; and executing a stage-by-stage physical synthesis based on determining that the threshold has been exceeded. The executing the stage-by-stage physical synthesis includes running a stage of the stage-by-stage physical synthesis to determine real timing slack; mapping the real timing slack to virtual timing slack; and running a next stage of the stage-by-stage physical synthesis using the virtual timing slack.

According to another embodiment, a system to perform physical synthesis of a chip design includes a memory device configured to store instructions; and a processor configured to execute the instructions to perform a baseline synthesis to determine timing slack associated with each device, the timing slack indicating a margin by which timing requirements for the associated device are exceeded, analyze a histogram of the timing slack to determine if a threshold has been exceeded, and when the threshold has been exceeded, execute a stage-by-stage physical synthesis that includes running a stage of the stage-by-stage physical synthesis to determine real timing slack, mapping the real timing slack to virtual timing slack, and running a next stage of the stage-by-stage physical synthesis using the virtual timing slack.

According to yet another embodiment, a computer program product to perform physical synthesis of a chip design includes a computer readable storage medium having program code embodied therewith. The program code is executable by a processor to perform a method including performing a baseline physical synthesis to determine timing slack associated with each device, the timing slack indicating a margin by which timing requirements for the associated device are exceeded; analyzing a histogram of the timing slack to determine if a threshold has been exceeded; and, when the threshold has been exceeded, executing a stage-by-stage physical synthesis. The executing the stage-by-stage physical synthesis including running a stage of the stage-by-stage physical synthesis to determine real timing slack; mapping the real timing slack to virtual timing slack; and running a next stage of the stage-by-stage physical synthesis using the virtual timing slack.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, during physical synthesis, current algorithms focus on portions of the design that do not meet timing requirements, even if those parts that have met timing needs have sub-optimal power or area usage. Yet, de-emphasizing these other parameters may lead to redundant buffer chains or unnecessary devices consuming area or power, or the use of scenic routes (longer than efficient interconnects), for example. Embodiments of the systems and methods detailed herein relate to improving sub-optimal design of performance non-critical components (i.e., those that meet timing) without detrimentally affecting timing. Specifically, the embodiments include the use of virtual slack. Real slack refers to the margin by which a timing criticality requirement is exceeded in a physical synthesis result. Virtual slack is an artificial slack value used, as detailed below, to modulate the physical synthesis in an attempt to improve the physical design even in areas that meet timing requirements. Physical synthesis is performed in stages, and the use of virtual slack facilitates driving synthesis efforts toward a better implementation even for originally non-critical (in terms of timing) components.

Figure 1:
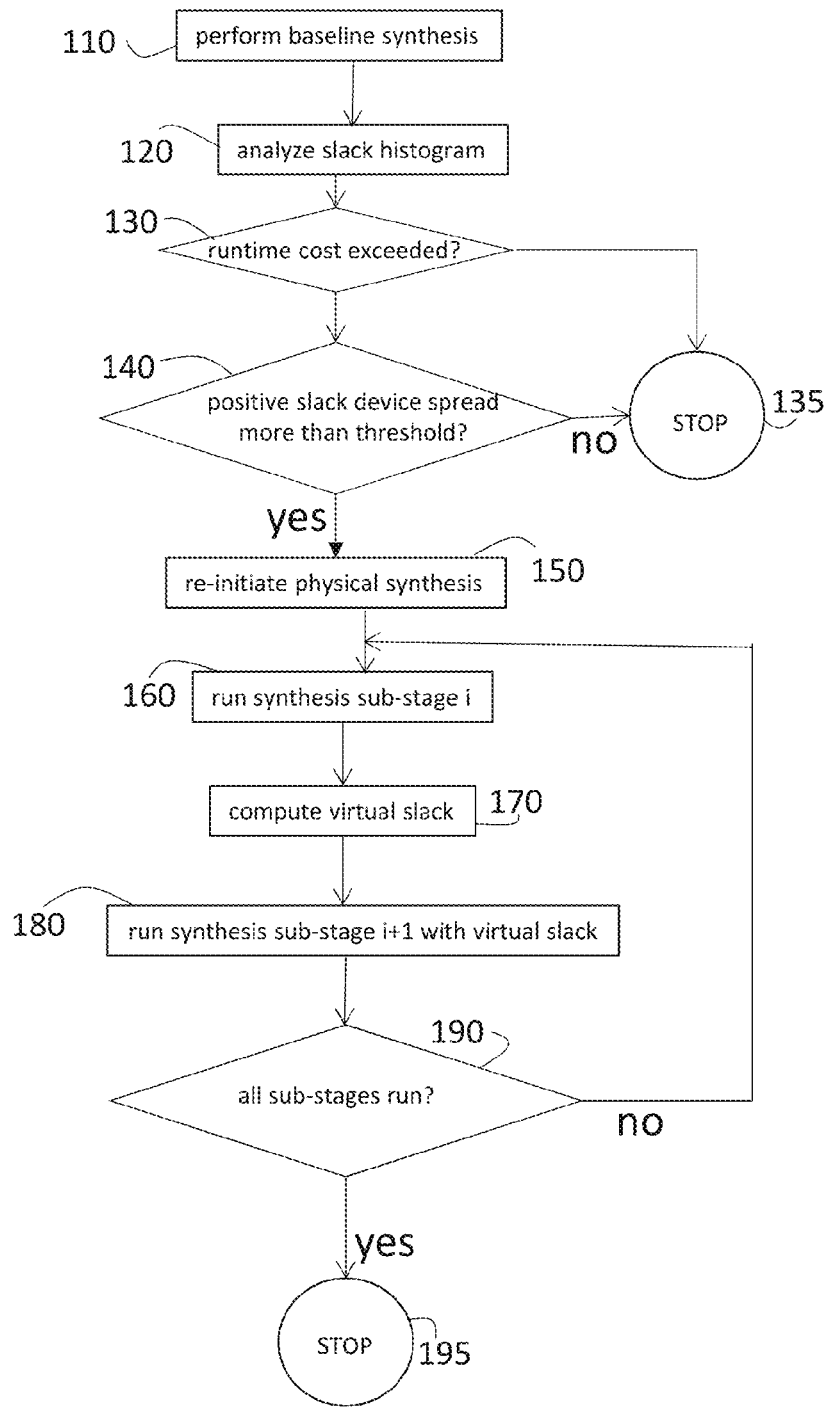
FIG. 1 is a process flow of a method of performing physical synthesis according to exemplary embodiments.

FIG. 1 is a process flow of a method of performing physical synthesis according to exemplary embodiments. At block 110, performing a baseline synthesis leads to obtaining the slack histogram. An exemplary slack histogram is discussed with reference to FIG. 2. Analyzing the slack histogram, at block 120, refers to determining the percentage of the design that meets or exceeds (i.e., has a positive real slack with regard to) timing criticality requirements. Analyzing (at block 120) also includes determining the spread of devices having positive slack. The granularity of the histogram may be modified based on the particular type of chip or other factors. An optional check, at block 130, is whether the runtime cost is exceeded. This step is optional because a runtime count may be maintained and checked as part of another process shown in FIG. 1. If the runtime cost is exceeded, then the process stops (block 135), regardless of how much positive slack is present or how much it is spread over the design. This is because, for practical purposes, runtime goals and constraints must be respected and take priority over optimizing every part of the physical design beyond meeting timing criticality. At block 140, it is determined whether the positive slack device spread is more than a specified threshold. If not, the processes are stopped (block 135). If the positive slack device spread is above a threshold, it means that more than a threshold number of devices have a relatively large positive slack. Thus, the chances of optimizing power and area consumption while still meeting timing requirements are more likely for those devices.

When runtime and slack spread decisions indicate that the processes should continue, the physical synthesis is re-initiated at block 150. As further discussed below, this re-initiation involves stopping the physical synthesis at each stage. At block 160, physical synthesis is run to sub-stage i. Virtual slack is computed at block 170. The process of determining virtual slack is discussed further below with reference to FIG. 3. At block 180, the physical synthesis is run for the next sub-stage i+1 using the virtual slack determined at block 170. By using the virtual slack computed at block 170 rather than real slack resulting from block 160, at least some areas of the design that would otherwise be overlooked for optimization are included in the physical synthesis process at block 180. That is, using the virtual slack artificially lowers the timing slack value for some areas to a level at which the synthesis tool includes those areas for re-synthesis. Thus, using the virtual slack (mapping real slack to virtual slack) facilitates manipulation of the synthesis tool to reconsider portions of the design that would normally be maintained based on their passing the timing requirements. This process is repeated for every sub-stage of design by checking, at block 190, to see whether the last sub-stage has been reached. When all sub-stages have been run (block 190), then the processes stop (block 195). Until all sub-stages have not been run, the processes from blocks 160 through 190 are repeated.

Figure 2:
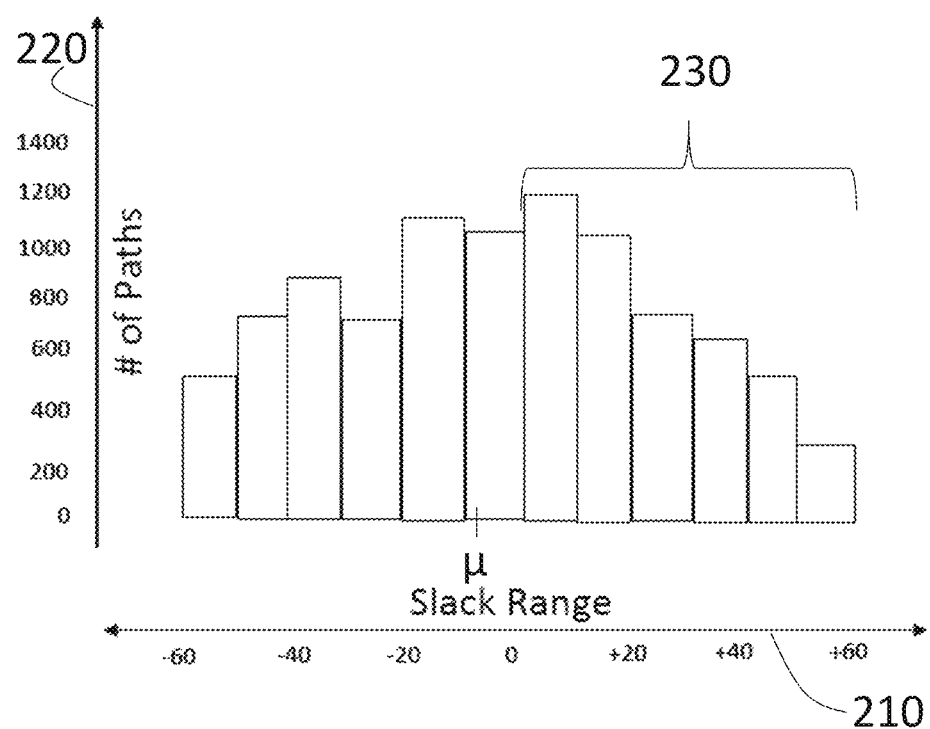
FIG. 2 shows an exemplary slack histogram used to conduct physical synthesis according to embodiments.

FIG. 2 shows an exemplary slack histogram used to conduct physical synthesis according to embodiments. As noted above, the granularity or number of slack bins may be determined based on the particular type of chip or other parameters and need not be any fixed value. The time slack (difference between timing requirement and achieved timing, typically in picoseconds) is indicated along the slack range axis 210, and the number of paths associated with each time slack is indicated on axis 220. The mean (µ) time slack is indicated in FIG. 2. This value may be positive, negative, or zero, depending on the result of the physical synthesis. For example, in earlier stages of physical synthesis, prior to any optimizations or adjustments, the mean µ may be more likely to be negative or a low positive time slack. The time slack values shown in FIG. 2 also have an associated variance (σ). Determination of mean and variance is according to known statistical algorithms. The time slack bins indicating positive timing slack are labeled as 230 in the exemplary illustration of FIG. 2. The positive slack device spread discussed above with reference to FIG. 1 refers to the number of paths having positive slack time (number of paths in 230) and the number of bins over which the positive time slack paths are spread. The process of determining virtual slack is further discussed below with reference to FIG. 3.

Figure 3:
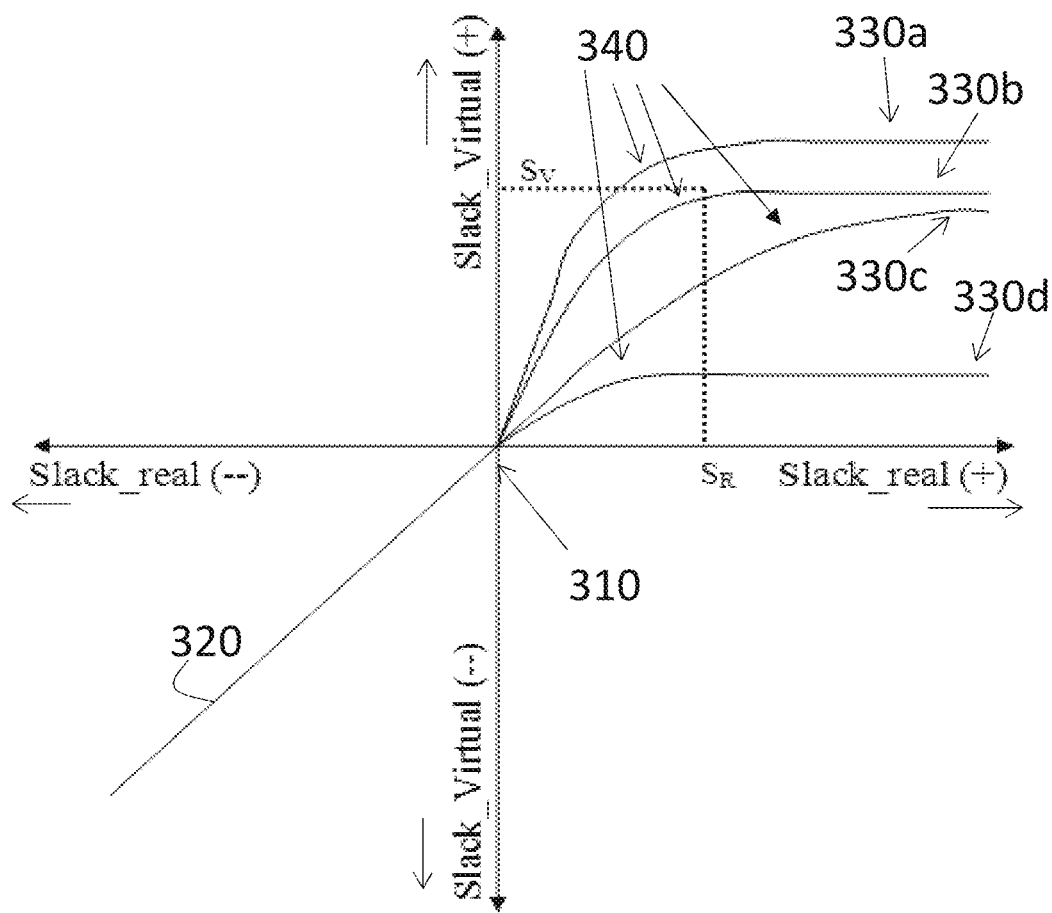
FIG. 3 illustrates examples of a virtual positive slack function (VPSF) according to exemplary embodiments.

FIG. 3 illustrates examples of a virtual positive slack function (VPSF) according to exemplary embodiments. A VPSF facilitates mapping real slack ($S_R$) to virtual slack ($S_V$) according to block 170 in FIG. 1. This mapping then allows running the next stage of physical synthesis using the virtual slack rather than real slack (block 180, FIG. 1). The point 310 need not be (0,0). The positive slack device spread threshold or another threshold may be used in defining the starting point (310) for mapping instead. Real slack ($S_R$) values below point 310 are mapped to the same virtual slack ($S_V$) value based on the transfer function indicated by the line 320 in FIG. 3. The mapping of real slack ($S_R$) above point 310 to virtual slack ($S_V$) is according to:

$$S_V = C_1 - C_2 * e^{-C_3 * S_R} \quad [\text{EQ. 1}]$$

$C_1$, $C_2$, and $C_3$ are modeling constants derived from the mean µ and variance σ of the slack histogram. They are scale factors that tune the transfer function 330 that maps real slack ($S_R$) to virtual slack ($S_V$). C1, C2, C3 are empirical scale factors that are determined and calibrated based on the nature of the transfer function 330 (e.g., Gaussian, Exponential, Log-Normal), the range of virtual slack values, and the preferred knee point 340 of the transfer function 330, which is discussed below For example, FIG. 3 illustrates real slack ($S_R$) to virtual slack ($S_V$) transfer functions 330a-330d (generally referred to as 330) using four different sets of $C_1$, $C_2$, and C3. As FIG. 3 illustrates, each real slack ($S_R$) to virtual slack ($S_V$) transfer function 330 includes a knee point 340 or taper point. The modeling constants $C_1$, $C_2$, and $C_3$ affect the position of this knee point 340 as well as the slope of the corresponding transfer function 330 before and after the knee point. As such, the modeling constants $C_1$, $C_2$, and $C_3$ affect how much of a design that already meets timing requirements is further optimized in the physical synthesis process. Below the knee point 340, in comparison to above the knee point 340, the transfer function 330 is steeper and tends to taper after the knee point 340. This may be referred to as progressive slack compression. That is, as real slack ($S_R$) increases, the reduction of the real slack ($S_R$) value when projected onto or mapped to the virtual slack ($S_V$) axis increases. As a result, real slack ($S_R$) values that are closer to 0 (i.e., timing slack that indicates that the device did not meet timing requirements with a high margin) map to nearly the same virtual slack ($S_V$) values. Real slack ($S_R$) values that are higher (i.e., timing slack indicates that the device meets timing requirements with a high margin) map to lower virtual slack ($S_V$) values. This progressive slack compression leads the physical synthesis tool to view devices with large slack or margin in meeting timing requirements as having less slack or margin. As a result, the physical synthesis may rerun and further optimize these devices (as part of the process at block 180, FIG. 1), thereby improving their power and area usage. The positive slack device spread threshold may be set by a designer based on the extent of the design expected to be outside the scope of the virtual positive slack transfer function 330. That is, timing optimization does not require the mapping from real slack to virtual slack. Thus, because redesign to improve power and area usage may result in minor disturbances in timing slack, the threshold may be selected to strike the balance between timing optimization and power and area optimization.

Figure 4:
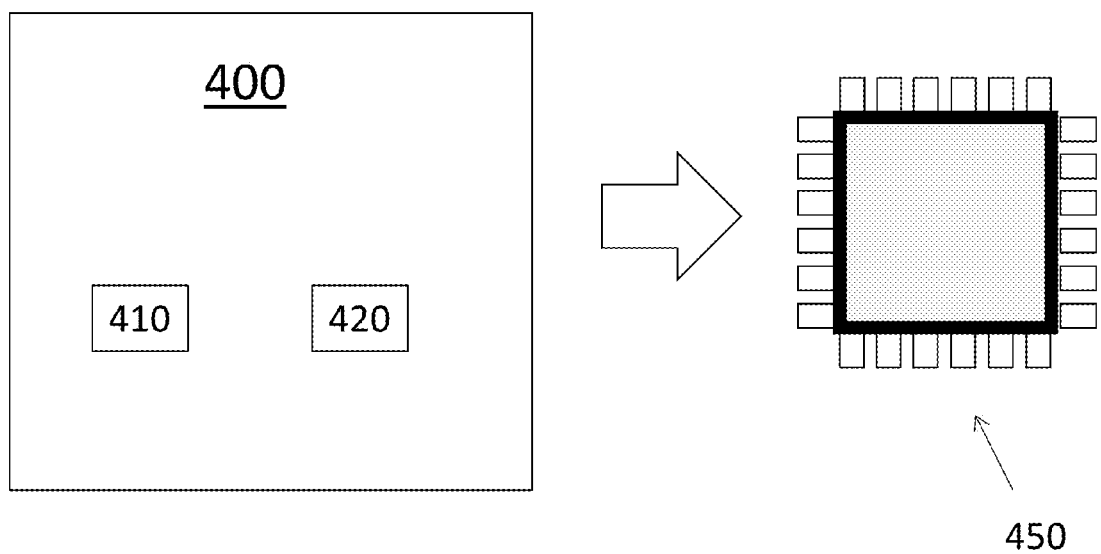
FIG. 4 is a block diagram of a system that performs physical synthesis according to embodiments discussed herein.

FIG. 4 is a block diagram of a system 400 that performs physical synthesis according to embodiments discussed herein. The system 400 includes one or more memory devices and one or more processing circuits or processors 420. The physical design determined using the system 400 results in the chip 450. The one or more memory devices 410 store instructions relating to the mapping of real memory to virtual memory and other processes detailed herein. The processors 420 execute the instructions to implement the processes. The memory devices 410 may also store information additional to the instructions to perform virtual slack mapping and other processes. Technical effects of the embodiments discussed herein include re-design of physical implementation in selectively determined areas even after timing constraints are met.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system to perform physical synthesis of a chip design, the system comprising:
    a memory device configured to store instructions; and
    a processor configured to execute the instructions to perform a baseline synthesis to determine timing slack associated with each of a plurality of devices, the timing slack indicating a margin by which timing requirements for the associated device are exceeded, analyze a histogram of the timing slack to determine whether a threshold that indicates a spread of the timing slack among the plurality of devices has been exceeded, and when the threshold has been exceeded, execute a stage-by-stage physical synthesis that includes running a stage of the stage-by-stage physical synthesis to determine real timing slack, mapping the real timing slack to virtual timing slack that is lower than the real timing slack, and running a next stage of the stage-by-stage physical synthesis using the virtual timing slack.

2. The system according to claim 1, wherein the processor tracks a runtime cost and executes the stage-by-stage physical synthesis when the runtime cost is below a runtime cost threshold.

3. The system according to claim 1, wherein the processor determines a mean and variance as part of the analysis of the histogram.

4. The system according to claim 3, wherein the processor develops a transfer function as a basis for the mapping the real timing slack to the virtual timing slack.

5. The system according to claim 4, wherein the processor develops the transfer function based on the mean and the variance.

6. The system according to claim 1, wherein the processor executes the stage-by-stage physical synthesis iteratively for every stage of the chip design.

7. A computer program product to perform physical synthesis of a chip design, the computer program product comprising a computer readable storage medium having program code embodied therewith, the program code executable by a processor to perform a method comprising:
    performing a baseline physical synthesis to determine timing slack associated with each of a plurality of devices, the timing slack indicating a margin by which timing requirements for the associated device are exceeded;
    analyzing a histogram of the timing slack to determine whether a threshold that indicates a spread of the timing slack among the plurality of devices has been exceeded; and
    when the threshold has been exceeded, executing a stage-by-stage physical synthesis, the executing the stage-by-stage physical synthesis comprising:
        running a stage of the stage-by-stage physical synthesis to determine real timing slack;
        mapping the real timing slack to virtual timing slack that is lower than the real timing slack; and
        running a next stage of the stage-by-stage physical synthesis using the virtual timing slack.

8. The computer program product according to claim 7, further comprising tracking a runtime cost, wherein the executing the stage-by-stage physical synthesis is performed when the runtime cost is below a runtime cost threshold.

9. The computer program product according to claim 7, wherein the analyzing the histogram of the timing slack includes determining a mean and variance.

10. The computer program product according to claim 9, further comprising developing a transfer function as a basis for the mapping the real timing slack to the virtual timing slack.

11. The computer program product according to claim 10, wherein the developing the transfer function is based on the mean and the variance.

12. The computer program product according to claim 7, wherein the executing the stage-by-stage physical synthesis is performed iteratively for every stage of the chip design.

* * * * *